United States Patent
Morrison

(10) Patent No.: US 9,626,813 B2
(45) Date of Patent: Apr. 18, 2017

(54) CONTROL DEVICE FOR AUTOMATIC TRANSMISSION AND CONTROL METHOD THERFOR

(71) Applicant: JATCO Ltd, Fuji-shi, Shizuoka (JP)

(72) Inventor: Quinn Morrison, Minneapolis, MN (US)

(73) Assignee: JATCO Ltd, Fuji-Shi (JP)

( * ) Notice: Subject to any disclaimer, the term of this patent is extended or adjusted under 35 U.S.C. 154(b) by 38 days.

(21) Appl. No.: 14/602,715

(22) Filed: Jan. 22, 2015

(65) Prior Publication Data

US 2016/0217629 A1    Jul. 28, 2016

(51) Int. Cl.
| | |
|---|---|
| *G01M 17/00* | (2006.01) |
| *G07C 5/08* | (2006.01) |
| *F16H 61/12* | (2010.01) |
| *F16H 61/14* | (2006.01) |
| *F16H 45/02* | (2006.01) |
| *G07C 5/00* | (2006.01) |
| *F16H 59/18* | (2006.01) |
| *F16H 59/46* | (2006.01) |
| *F16H 61/00* | (2006.01) |

(52) U.S. Cl.
CPC ........... *G07C 5/0808* (2013.01); *F16H 45/02* (2013.01); *F16H 61/12* (2013.01); *F16H 61/143* (2013.01); *G07C 5/006* (2013.01); *F16H 2059/186* (2013.01); *F16H 2059/467* (2013.01); *F16H 2061/0087* (2013.01); *F16H 2061/1208* (2013.01)

(58) Field of Classification Search
CPC .................................. G06F 19/00; B60T 7/12
USPC .................. 701/33.9, 51, 67, 97; 477/48, 62
See application file for complete search history.

(56) References Cited

U.S. PATENT DOCUMENTS

| | | | |
|---|---|---|---|
| 6,139,472 A | 10/2000 | Harada et al. | |
| 8,447,490 B2* | 5/2013 | Yoshimizu | F16H 61/12 477/143 |
| 2002/0193202 A1* | 12/2002 | Toyoda | F16H 61/143 477/62 |
| 2010/0191407 A1* | 7/2010 | Tanaka | F16H 61/12 701/31.4 |
| 2015/0134215 A1* | 5/2015 | Kawaguchi | F16H 61/143 701/67 |

FOREIGN PATENT DOCUMENTS

| | | |
|---|---|---|
| DE | 10 2010 003 520 A1 | 10/2011 |
| JP | 04-236846 A | 8/1992 |
| JP | 11-159608 A | 6/1999 |

* cited by examiner

*Primary Examiner* — Thomas G Black
*Assistant Examiner* — Luke Huynh
(74) *Attorney, Agent, or Firm* — Foley & Lardner LLP

(57) ABSTRACT

A control device for an automatic transmission, with a torque converter including a lock-up clutch, includes a learning unit configured to learn an engagement holding pressure, which is a hydraulic pressure immediately before the lock-up clutch is released, during coasting, and a determination unit configured to determine during learning in the learning unit whether or not an ON-failure in which the lock-up clutch is held in an engaged state in response to a release instruction has occurred.

4 Claims, 5 Drawing Sheets

CONTROL DEVICE FOR AUTOMATIC TRANSMISSION AND CONTROL METHOD THERFOR

TECHNICAL FIELD

The present invention relates to a control device for automatic transmission and a control method therefor.

BACKGROUND ART

JP4-236846A discloses a control device for determining the occurrence of an ON-failure in which a lock-up clutch cannot be released if the rotation speed of an input shaft and that of an output shaft of a torque converter continue to be equal although a release instruction is output to the lockup clutch.

In recent years, vehicles in which a lock-up clutch is released only when the vehicle starts and is engaged in other times have been on the increase to improve fuel economy. In other words, vehicles in which most operating regions the lock-up clutch is engaged and only at very low vehicle speed is the lock-up clutch released have been on the increase. Thus, such vehicles have a problem that there is less opportunity to instruct the release of the lock-up clutch and determine the ON-failure of the lock-up clutch and it is difficult to discover the ON-failure early.

As an alternative to this, it is possible to increase the chance of determining the ON-failure by outputting a release instruction to the lock-up clutch during normal traveling, or by narrowing the lock-up region and widening the converter region, for example, to discover the ON-failure early. However, this presents a problem of deteriorating fuel economy since a transmission loss in the torque converter becomes large.

SUMMARY OF INVENTION

The present invention was developed to solve such problems and aims to prevent the deterioration of fuel economy and discover an ON-failure early.

A control device for an automatic transmission according to one aspect of the present invention is a control device for an automatic transmission with a torque converter including a lock-up clutch and includes a learning unit configured to learn an engagement holding pressure, which is a hydraulic pressure immediately before the lock-up clutch is released, during coasting, and a determination unit configured to determine during learning in the learning unit whether or not an ON-failure in which the lock-up clutch is held in an engaged state in response to a release instruction has occurred.

A control method for an automatic transmission according to another aspect of the present invention is a control method for an automatic transmission with a torque converter including a lock-up clutch and learns an engagement holding pressure, which is a hydraulic pressure immediately before the lock-up clutch is released, during coasting, and determines during learning whether or not an ON-failure in which the lock-up clutch is held in an engaged state in response to a release instruction has occurred.

According to these aspects, the ON-failure can be detected early without deteriorating fuel economy.

DESCRIPTION OF EMBODIMENT

Hereinafter, an embodiment of the present invention is described with reference to the accompanying drawings.

Figure 1:
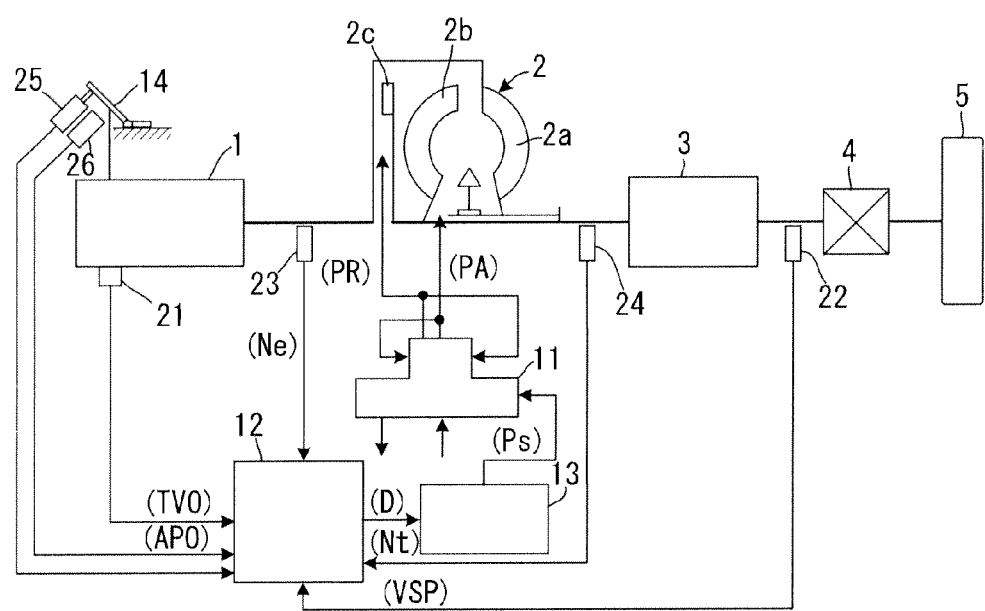
FIG. 1 is a schematic configuration diagram of a vehicle of an embodiment.

FIG. 1 is a schematic configuration diagram of a vehicle of the present embodiment. The vehicle includes an engine 1, a torque converter 2, a continuously variable transmission 3, a differential gear device 4, wheels 5 and a controller 12.

The torque converter 2 includes a pump impeller 2a to which rotation is transmitted from the engine 1, a turbine runner 2b for transmitting the rotation to the continuously variable transmission 3 and a lock-up clutch 2c capable of directly coupling the pump impeller 2a and the turbine runner 2b.

The lock-up clutch 2c operates according to a differential pressure between an apply pressure PA and a release pressure PR. If the apply pressure PA is lower than the release pressure PR, the lock-up clutch 2c is released and the torque converter 2 is set in a converter state. If the apply pressure PA is higher than the release pressure PR, the pump impeller 2a and the turbine runner 2b are directly coupled, the lock-up clutch 2c is engaged and the torque converter 2 is set in a lock-up state. The differential pressure between the apply pressure PA and the release pressure PR is adjusted by a lock-up control valve 11. It should be noted that it is also possible to half-engage the lock-up clutch 2c and set the torque converter 2c in a slip state by adjusting the differential pressure.

A signal pressure Ps and the fed-back release pressure PR act on one surface of the lock-up control valve 11 and the fed-back apply pressure PA and a spring force Fs of a spring 11a act on the opposite surface. The signal pressure Ps is controlled by a lock-up solenoid 13. Oil from a regulator valve 30 is supplied for the apply pressure PA directly or by way of a torque converter release valve 31.

Figure 2:
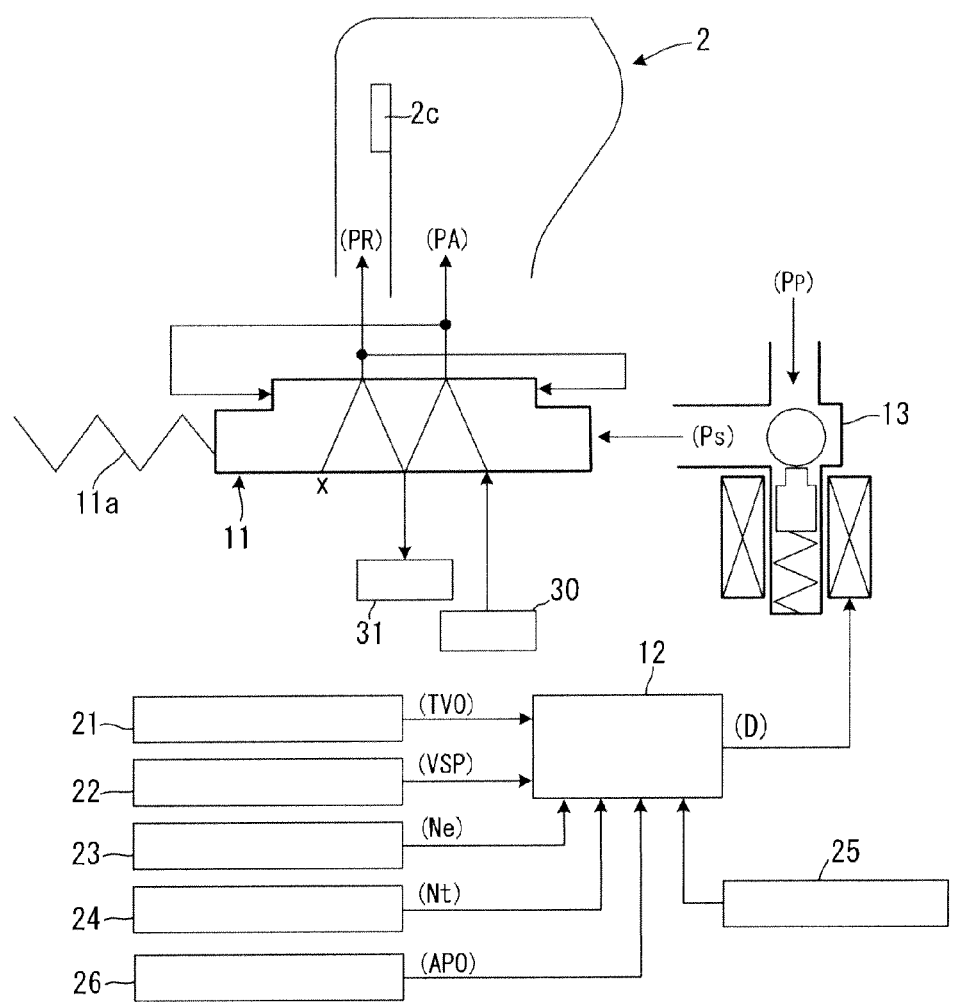
FIG. 2 is a schematic diagram showing the operation of a lock-up clutch.

The lock-up solenoid 13 controls the signal pressure Ps based on a duty signal D transmitted from the controller 12 using a pilot pressure Pp, which is a constant pressure, as a source pressure as shown in FIG. 2.

As the signal pressure Ps increases, the apply pressure PA increases. When the apply pressure PA becomes higher than the release pressure PR, the lock-up clutch 2c is engaged and the torque converter 2 is set in the lock-up state. On the other hand, when the signal pressure Ps decreases from the lock-up state and the apply pressure PA becomes lower than the release pressure PR, the lock-up clutch 2c is released and the torque converter 2 is set in the converter state. In this way, the engaged/released state of the lock-up clutch 2c is changed by controlling the duty signal D to control the signal pressure Ps.

If the torque converter 2 is in the lock-up state, the torque is transmittable via the lock-up clutch 2c, i.e. a lock-up capacity is changed according to the differential pressure. As the differential pressure becomes larger, an engagement force of the lock-up clutch 2c becomes larger and the lock-up capacity becomes larger. The signal pressure Ps is so controlled that a desired engagement force (lock-up capacity) is generated in the torque converter 2.

The controller 12 is composed of a CPU, a ROM, a RAM and the like and each function is fulfilled by reading a program stored in the ROM by the CPU.

To the controller 12 are input a signal from a throttle opening sensor 21 for detecting a throttle opening TVO of the engine 1, a signal from a vehicle speed sensor 22 for detecting a vehicle speed VSP, a signal from an engine rotation speed sensor 23 for detecting a rotation speed Ne of an output shaft of the engine 1, a signal from a turbine rotation sensor 24 for detecting a rotation speed Nt of the turbine runner 2b, a signal from an idle switch 25 which is turned on when an accelerator pedal 14 is not depressed and a signal from an accelerator pedal opening sensor 26 for detecting an accelerator pedal opening APO.

Figure 3:
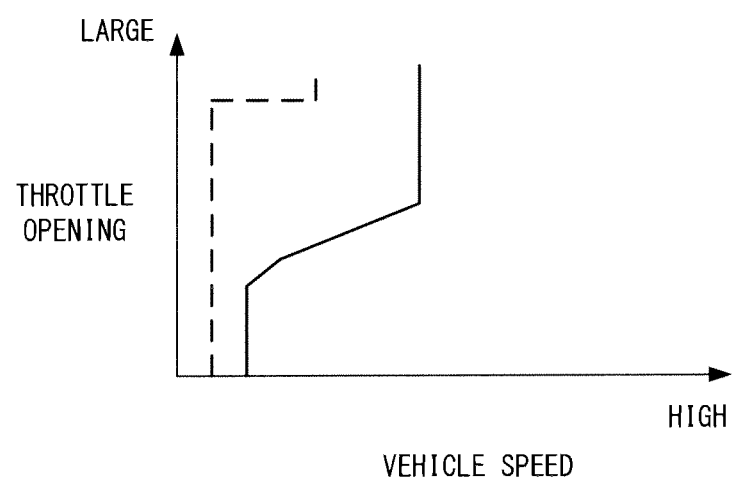
FIG. 3 is a map showing an engagement schedule of the lock-up clutch.

Since the pump impeller 2a and the turbine runner 2b are directly coupled when the lock-up clutch 2c is engaged, a transmission loss in the torque converter 2 is eliminated and fuel economy in the engine 1 can be improved. The engaged/released state of the lock-up clutch 2c is switched based on the vehicle speed VSP and the throttle opening TVO as shown in FIG. 3. An engagement switch line for switching the lock-up clutch 2c from the released state to the engaged state is shown in solid line and a release switch line for switching the lock-up clutch 2c from the engaged state to the released state is shown in broken line in FIG. 3. If, for example, the vehicle speed VSP increases and the engagement switch line is crossed in FIG. 3, the lock-up clutch 2c is engaged. Further, if, for example, the vehicle speed VSP decreases and the release switch line is crossed, the lock-up clutch 2c is released. In the present embodiment, the release switch line is set at a very low vehicle speed to enlarge the lock-up region, where the lock-up clutch 2c is engaged, to improve fuel economy.

However, if the lock-up region is enlarged by reducing the vehicle speed for lock-up clutch engagement, the occurrence of outputting an instruction to release the lock-up clutch 2c decreases, e.g. the instruction is output only immediately before the vehicle stops, and the chance of detecting the occurrence of an ON-failure in which the lock-up clutch 2c is held in the engaged state in response to the release instruction decreases.

Accordingly, in the present embodiment, an ON-failure determination is made during a coast lock-up capacity learning control to be described below to enable the ON-failure to be discovered early in the event of the ON-failure.

The coast lock-up capacity is a lock-up capacity when the differential pressure between the apply pressure PA and the release pressure PR is set at a minimum differential pressure at which the lock-up clutch 2c is engaged, i.e. the signal pressure Ps immediately before the lock-up clutch 2c is released during coasting in which a drive force is input from the wheels 5 in a state where the engine 1 is powered off. By setting the lock-up capacity at the coast lock-up capacity during coasting, the occurrence of an engine stall can be prevented by immediately releasing the lock-up clutch 2c if the vehicle suddenly decelerates during coasting.

The coast lock-up capacity learning control is a control of learning the above coast lock-up capacity during coasting, i.e. the signal pressure Ps (engagement holding hydraulic pressure) immediately before the lock-up clutch 2c is released during coasting, and a control which is executed every time a predetermined condition holds and executed to constantly maintain the above minimum differential pressure during coasting even if there is a change over time or the like.

Figure 4:
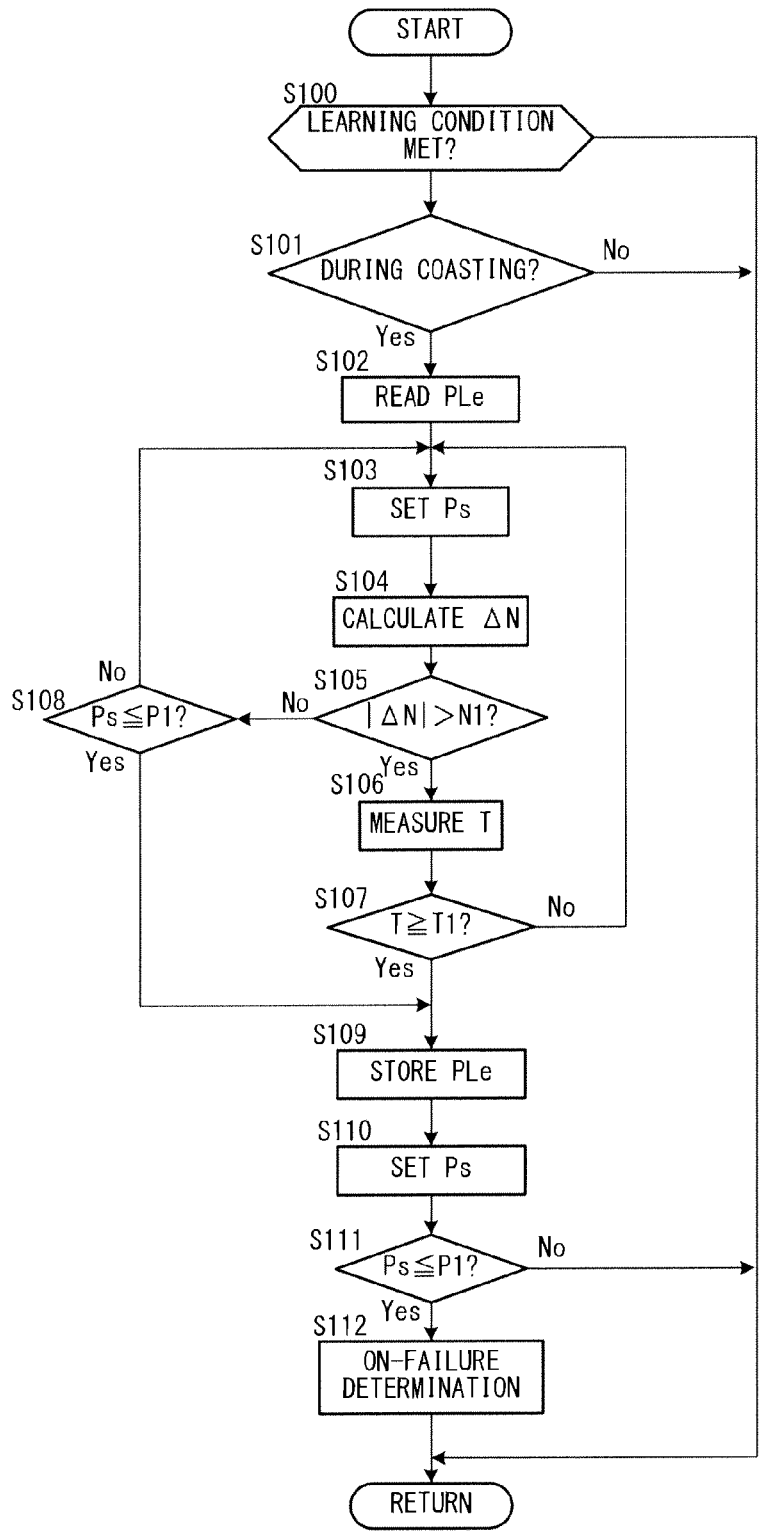
FIG. 4 is a flow chart showing a coast lock-up capacity learning control.

Next, the coast lock-up capacity learning control of the present embodiment is described using a flow chart of FIG. 4.

In Step S100, the controller 12 determines whether or not a coast lock-up capacity learning condition is met. The coast lock-up capacity learning condition is a condition capable of determining that any failure that affects the control of the signal pressure Ps has not occurred. Specifically, the controller 12 determines whether or not a failure has occurred in the vehicle speed sensor 22, the turbine rotation sensor 24 and an oil temperature sensor, whether or not oil temperature is within a predetermined oil temperature range and the like. The controller 12 determines that the coast lock-up capacity learning condition is met, for example, if no failure has occurred in each sensor and the oil temperature is within the predetermined oil temperature range. A process proceeds to Step S101 if the coast lock-up capacity learning condition is met, whereas the process this time is finished unless the coast lock-up capacity learning condition is met.

In Step S101, the controller 12 determines whether or not the vehicle is in coasting. Specifically, the controller 12 determines whether or not a signal from the idle switch 25 is ON. The controller 12 determines that the vehicle is in coasting if the accelerator pedal 14 is not depressed and the signal from the idle switch 25 is ON. It should be noted that whether or not the vehicle is in coasting may be determined based on a signal from the throttle opening sensor 21 and a signal from the accelerator pedal opening sensor 26. The process proceeds to Step S102 if the vehicle is in coasting, whereas the process this time is finished unless the vehicle is in coasting.

In Step S102, the controller 12 reads a currently stored learning value PLe. It should be noted that an initial value set in advance is read unless the learning value PLe is set.

In Step S103, the controller 12 sets the signal pressure Ps. Specifically, the controller 12 sets a value obtained by adding an offset value to the read learning value PLe as the signal pressure Ps if the signal pressure Ps is set for the first time in the process this time, and controls the duty signal D so that the signal pressure Ps acts on the lock-up control valve 11. The offset value is a value set in advance. Further, a value obtained by subtracting a predetermined value from the currently set signal pressure Ps is set as a new signal pressure Ps if the process returns from Step S107 or S108 to be described later, and the duty signal D is controlled to act on the lock-up control valve 11. The predetermined value is a value set in advance.

In Step S104, the controller 12 calculates the absolute value of the rotation speed difference ΔN between input and output shafts of the torque converter 2 based on a signal from the engine rotation sensor 23 and a signal from the turbine rotation sensor 24.

In Step S105, the controller 12 determines whether or not the calculated absolute value of the rotation speed difference ΔN is larger than a predetermined rotation speed difference N1. The predetermined rotation speed difference N1 is a rotation speed difference capable of determining that the lock-up clutch 2c has been released. The rotation speed difference ΔN is zero if the lock-up clutch 2c is engaged, but is no longer zero if the lock-up clutch 2c is released. It should be noted that the predetermined rotation speed difference N1 is desirably set at a minimum rotation speed difference capable of determining that the lock-up clutch 2c has been released. The controller 12 determines that the lock-up clutch 2c is not released if the absolute value of the rotation speed difference ΔN is less than or equal to the predetermined rotation speed difference N1. The process proceeds to Step S106 if the absolute value of the rotation speed difference ΔN is larger than the predetermined rotation speed difference N1 while proceeding to Step S108 if the absolute value of the rotation speed difference ΔN is less than or equal to the predetermined rotation speed difference N1.

In Step S106, the controller 12 actuates a timer to measure an elapsed time T from a point of time at which the absolute value of the rotation speed difference ΔN becomes larger than the predetermined rotation speed difference N1. It should be noted that the elapsed time T is reset when the absolute value of the rotation speed difference ΔN becomes less than or equal to the predetermined rotation speed difference N1.

In Step S107, the controller 12 determines whether or not the elapsed time T has become less than or equal to the first predetermined time T1. The first predetermined time T1 is a time set in advance and capable of precisely determining that the absolute value of the rotation speed difference ΔN has become larger than the predetermined rotation speed difference N1 and the lock-up clutch 2c has been released. By determining whether or not the elapsed time T has become less than or equal to the first predetermined time T1 in this way, erroneous detection on the release of the lock-up clutch 2c can be prevented. The controller 12 determines that the lock-up clutch 2c has been released when the elapsed time T becomes less than or equal to the first predetermined time T1. The process proceeds to Step S109 if the elapsed time T has become less than or equal to the first predetermined time T1 while returning to Step S103 to repeat the above process if the elapsed time T is shorter than the first predetermined time T1.

In Step S108, the controller 12 determines whether or not the signal pressure Ps is less than or equal to a predetermined pressure P1. The predetermined pressure P1 is an ON-failure determination threshold value and set at the signal pressure Ps (release pressure) at which the lock-up clutch 2c should be released if no ON-failure has occurred even if there is a manufacturing error or deterioration over time. It should be noted that the predetermined pressure P1 may be a signal pressure lower than a pressure at which the lock-up clutch 2c is released if no ON-failure has occurred, e.g. such a signal pressure that the release pressure PR−the apply pressure PA>the predetermined differential pressure. The process proceeds to Step S109 if the signal pressure Ps is less than or equal to the predetermined pressure P1 while returning to Step S103 to repeat the above process if the signal pressure Ps is higher than the predetermined pressure P1.

In Step S109, the controller 12 updates the learning value PLe and stores the new learning value PLe. The controller 12 stores a value obtained by subtracting an offset pressure from the signal pressure Ps when the absolute value of the rotation speed difference ΔN became larger than the predetermined rotation speed difference N1 as a new learning value PLe if the absolute value of the rotation speed difference ΔN is larger than the predetermined rotation speed difference N1 and that state has continued for the first predetermined time T1. This stored learning value PLe corresponds to the signal pressure Ps when the lock-up clutch 2c was released. When a signal pressure Ps obtained by adding the offset pressure to this signal pressure Ps is output, the lock-up capacity can be set at the coast lock-up capacity immediately before the lock-up clutch 2c is released. In this way, the coast lock-up capacity corresponding to a state of the vehicle can be learned. Further, when the signal pressure Ps becomes less than or equal to the predetermined pressure P1, the controller 12 stores a value obtained by subtracting the offset pressure from the signal pressure Ps when the signal pressure Ps becomes less than or equal to the predetermined pressure P1 as a new learning value PLe.

In Step S110, the controller 12 sets the signal pressure Ps at a value obtained by adding the offset value to the new learning value PLe and controls the duty signal D so that the signal pressure Ps acts on the lock-up control valve 11. In this way, the newly set signal pressure Ps is held during coasting thereafter.

In Step S111, the controller 12 determines whether or not the signal pressure Ps is determined to be less than or equal to the predetermined pressure P1 in Step S108. The process proceeds to Step S112 if the signal pressure Ps is determined to be less than or equal to the predetermined pressure P1 in Step S108, whereas the process this time is finished unless the signal pressure Ps is determined to be less than or equal to the predetermined pressure P1 in Step S108, i.e. if the elapsed time T is determined to have become less than or equal to the first predetermined time T1 in Step S107.

In Step S112, the controller 12 determines the occurrence of an ON-failure and this determination result is stored in the controller 12.

Figure 5:
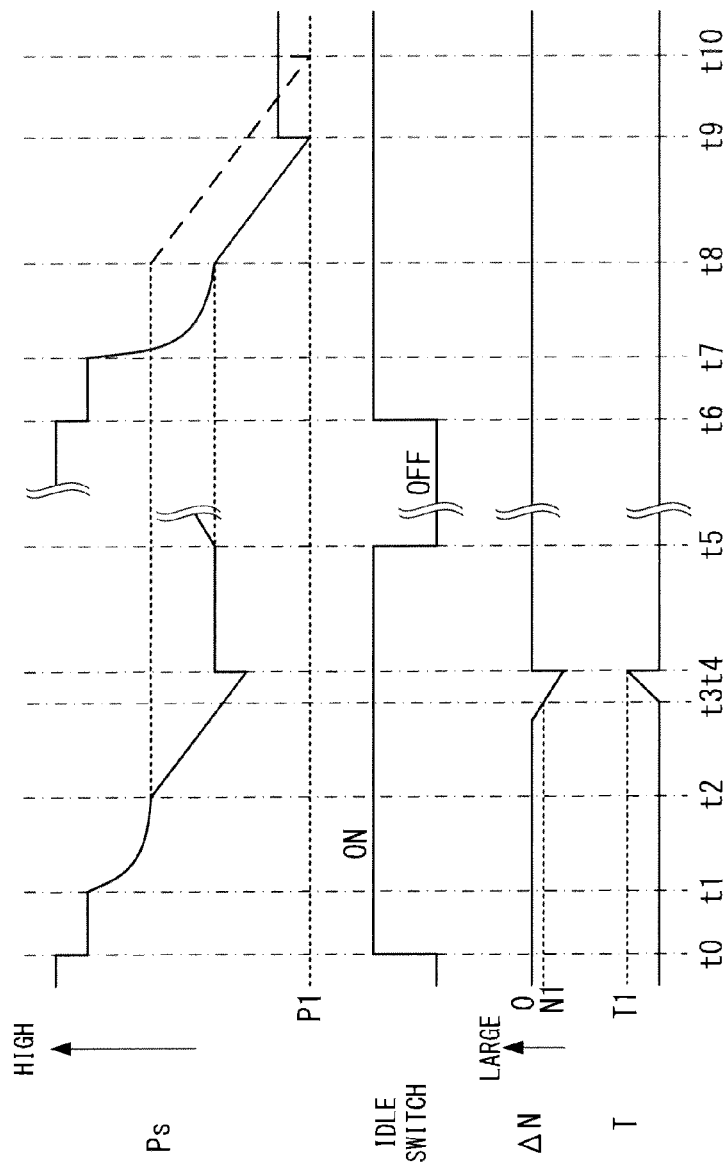
FIG. 5 is a time chart showing the coast lock-up capacity learning control.

Next, the coast lock-up capacity learning control is described using a time chart of FIG. 5. It should be noted that a fuel cut for stopping fuel injection into the engine 1 is carried out during coasting here.

At time t0, the accelerator pedal 14 is no longer depressed during travel, the idle switch 25 is turned on and coasting is started. In this way, the fuel cut is carried out. However, the fuel cut is actually carried out after a second predetermined time after the accelerator pedal 14 is no longer depressed. Further, a torque output from the engine 1 is small and unstable in some cases until the fuel cut is carried out. Thus, the signal pressure Ps is held at a second predetermined pressure, at which the lock-up clutch 2c is not released, for the second predetermined time until the fuel cut is actually carried out.

At time t1 after the elapse of the second predetermined time, the signal pressure Ps is reduced to a value obtained by adding the offset pressure to the stored learning value PLe. Here, the signal pressure Ps is first reduced with a relatively large gain and then reduced with a relatively small gain to prevent undershoot.

When the signal pressure Ps reaches the value obtained by adding the offset pressure to the learning value PLe at time t2, the signal pressure Ps is gradually reduced based on the predetermined value from that value.

When the rotation speed difference ΔN becomes less than or equal to the predetermined rotation speed difference N1 at time t3, the timer is triggered to start measuring the elapsed time T.

When the elapsed time T reaches the first predetermined time T1 at time t4, the lock-up clutch 2c is determined to have been released and a value obtained by subtracting the offset pressure from the signal pressure Ps when the rotation speed difference ΔN became equal to the predetermined rotation speed difference N1 is stored as a new learning value PLe. Further, the signal pressure Ps is increased to a value obtained by adding the offset pressure to the new learning value PLe. Here, the lock-up clutch 2c is released by reducing the signal pressure Ps to the signal pressure Ps lower than the previous learning value PLe, and the new learning value PLe is lower than the previous learning value PLe. Thus, the value obtained by adding the offset pressure to the new learning value PLe is lower than the value obtained by adding the offset pressure to the learning value PLe at time t2.

When the accelerator pedal 14 is depressed at time t5, coasting is finished and a transition is made to normal traveling.

At time t6, the accelerator pedal 14 is no longer depressed again, the idle switch 25 is turned on and coasting is started. Here, it is assumed that an ON-failure has occurred during a period from time t5 to time t6. The signal pressure Ps is held at the second predetermined pressure for the second predetermined time as at the time of the previous coasting.

At time t7 after the elapse of the second predetermined time, the signal pressure Ps is reduced to a value obtained by adding the offset pressure to the learning value PLe learned last time.

When the signal pressure Ps reaches the value obtained by adding the offset pressure to the learning value PLe learned last time at time t8, the signal pressure Ps is gradually reduced based on the predetermined value from that value (initial hydraulic pressure). Since the lock-up clutch 2c is held in the engaged state even if the signal pressure Ps is reduced in the event of an ON-failure, the rotation speed difference ΔN remains to be zero.

When the signal pressure Ps reaches the predetermined pressure P1 at time t9, the predetermined pressure P1 is stored as a new learning value PLe. Further, the signal pressure Ps is increased to the value obtained by adding the offset pressure to the new learning value PLe. In coasting this time, the signal pressure Ps is gradually reduced based on the predetermined value after being reduced to the value obtained by adding the offset pressure to the learning value PLe learned during the last coasting. Contrary to this, if the signal pressure Ps is reduced as during the last coasting (this signal pressure Ps is shown in broken line in FIG. 5), the signal pressure Ps reaches the predetermined pressure P1 at time t10 later than time t9 and the ON-failure is detected at this timing. Thus, if coasting is finished during a period from time t9 to time t10 without using the present embodiment, the ON-failure cannot be detected. On the other hand, in the present embodiment, the ON-failure can be detected at time t9 and can be detected early.

Effects of the embodiment of the present invention are described.

Since the ON-failure of the lock-up clutch 2c is determined during the coast lock-up capacity learning, a chance of detecting the occurrence of the ON-failure can be increased without narrowing the lock-up region. Thus, the ON-failure can be detected early in the event of the ON-failure. Specifically, in the event of the ON-failure, the ON-failure can be detected during coasting without waiting for the entry of the operating state into the converter region where the lock-up clutch 2c is released such as the vehicle speed VSP is reduced until a very low vehicle speed. Further, since the ON-failure can be determined without narrowing the lock-up region, the deterioration of fuel economy in the engine 1 can be prevented.

If the absolute value of the rotation speed difference ΔN does not become larger than the predetermined rotation speed difference N1 even when the signal pressure Ps falls to or below the predetermined pressure P1 that is the ON-failure determination threshold value, the occurrence of the ON-failure is determined. In this way, the ON-failure can be reliably detected even if there is a manufacturing error or deterioration over time.

The coast lock-up capacity learning control is a control of, after reducing the signal pressure Ps to the value obtained by adding the offset pressure to the newly learned learning value PLe, gradually reducing the signal pressure Ps from that value during the next learning if the signal pressure Ps at which the lock-up clutch 2c is released is newly learned. By determining the ON-failure of the lock-up clutch 2c in synchronization with the execution of the coast lock-up capacity learning control, the hydraulic pressure is reduced from the hydraulic pressure obtained by adding the offset pressure to the learning value PLe in the event of the ON-failure. Thus, a time until the signal pressure Ps becomes less than or equal to the predetermined pressure P1 that is the ON-failure determination threshold value can be shortened, for example, as compared with the case where the hydraulic pressure is gradually reduced with a predetermined gradient from a hydraulic pressure at which the engaged state in a drive state is maintained. Specifically, the ON-failure can be detected early.

Although the embodiment of the present invention has been described above, the above embodiment is merely one application example of the present invention and not of the nature to limit the technical scope of the prevent invention to the specific configuration of the above embodiment.

Although the continuously variable transmission has been described as an example in the above embodiment, there is no limitation to this and the prevent invention may be applied to a stepped transmission.

What is claimed is:

1. A control device for an automatic transmission with a torque converter including a lock-up clutch that is engaged and released in response to hydraulic pressure, comprising:
    a learning unit configured to learn an engagement holding pressure, which is the hydraulic pressure immediately before the lock-up clutch is released, during coasting, and
    a determination unit configured to determine, during learning in the learning unit, whether or not an ON-failure in which the lock-up clutch is held in an engaged state in response to a release instruction has occurred, on the basis of the hydraulic pressure.

2. A control device for an automatic transmission with a torque converter including a lock-up clutch, comprising:
    a learning unit configured to learn an engagement holding pressure, which is a hydraulic pressure immediately before the lock-up clutch is released, during coasting, and
    a determination unit configured to determine, during learning in the learning unit, whether or not an ON-failure in which the lock-up clutch is held in an engaged state in response to a release instruction has occurred,
    wherein the determination unit is configured to determine that the ON-failure has occurred if an instructed pressure becomes less than or equal to the pressure at which the lock-up clutch should release.

3. A control device for an automatic transmission with a torque converter including a lock-up clutch, comprising:
    a learning unit configured to learn an engagement holding pressure, which is a hydraulic pressure immediately before the lock-up clutch is released, during coasting, and
    a determination unit configured to determine, during learning in the learning unit, whether or not an ON-failure in which the lock-up clutch is held in an engaged state in response to a release instruction has occurred,
    wherein the learning unit is configured to reduce the hydraulic pressure from an initial hydraulic pressure, based on the learned engagement holding pressure, during next learning if the learning has been performed.

4. A control method for an automatic transmission with a torque converter including a lock-up clutch that is engaged and released in response to hydraulic pressure, comprising:
  learning an engagement holding pressure, which is the hydraulic pressure immediately before the lock-up clutch is released, during coasting, and
  determining during learning, whether or not an ON-failure, in which the lock-up clutch is held in an engaged state in response to a release instruction, has occurred, on the basis of the hydraulic pressure.

* * * * *